US011965574B2

(12) United States Patent
Ji

(10) Patent No.: US 11,965,574 B2
(45) Date of Patent: Apr. 23, 2024

(54) COMPACT PRECISION ANGULAR-DISPLACEMENT-LIMITING IMPACT-RESISTANT VIBRATION-ISOLATING BUFFERING PLATFORM FOR COMPACT OPTOELECTRONIC EQUIPMENT

(71) Applicant: DANDELION ENVIRONMENTAL TECHNOLOGY PRIVATE LIMITED, Singapore (SG)

(72) Inventor: JiongJiong Ji, Singapore (SG)

(73) Assignee: DANDELION ENVIRONMENTAL TECHNOLOGY PRIVATE LIMITED, Singapore (SG)

( * ) Notice: Subject to any disclaimer, the term of this patent is extended or adjusted under 35 U.S.C. 154(b) by 326 days.

(21) Appl. No.: 17/439,316

(22) PCT Filed: Mar. 20, 2020

(86) PCT No.: PCT/SG2020/050151
§ 371 (c)(1),
(2) Date: Sep. 14, 2021

(87) PCT Pub. No.: WO2020/197491
PCT Pub. Date: Oct. 1, 2020

(65) Prior Publication Data
US 2022/0154799 A1     May 19, 2022

(30) Foreign Application Priority Data

Mar. 25, 2019   (CN) .......................... 201910227620.1
Mar. 25, 2019   (CN) .......................... 201910227669.7

(Continued)

(51) Int. Cl.
*F16F 15/00*     (2006.01)
*F16C 29/06*     (2006.01)
*F16F 15/02*     (2006.01)

(52) U.S. Cl.
CPC .......... *F16F 15/02* (2013.01); *F16C 29/0642* (2013.01)

(58) Field of Classification Search
None
See application file for complete search history.

(56) References Cited

U.S. PATENT DOCUMENTS 5,669,594 A *   9/1997   Platus ..................... F16F 15/06
                                                                            248/619
5,833,204 A *   11/1998   Platus ..................... F16F 15/02
                                                                            248/619

(Continued)

FOREIGN PATENT DOCUMENTS

CN        203202103 U    9/2013
CN        204647114 U    9/2015
CN        105805212 A    7/2016
EP             48598 A *   3/1982  ............. F16F 15/02

*Primary Examiner* — Steven M Marsh
(74) *Attorney, Agent, or Firm* — Sinorica International Patent & Trademark

(57) ABSTRACT

The application provides a compact precision angular-displacement-limiting impact-resistant vibration-isolating buffering platform for compact optoelectronic equipment. The platform comprises an optoelectronic equipment mounting plate and a bottom mounting plate, the optoelectronic equipment mounting plate and the bottom mounting plate are coupled via an angular-displacement-limiting assembly and a vibration-isolating buffering assembly, the vibration-isolating buffering assembly comprises a horizontal axial vibration-isolating buffering device and a vertical axial vibration-isolating buffering device, the vertical axial vibration-isolating buffering device has a vertical elastic supporting center O which is coincided with a mass center C, and the (Continued)

horizontal axial vibration-isolating buffering device has an elastic supporting plane which approaches to be coincided with a horizontal plane of the mass center. The platform of the subject application may effectively isolate and buffer severe impact and intense vibration environment to the optoelectronic equipment, the optoelectronic equipment is fixed on the optoelectronic equipment mounting plate; bottom mounting plate is fixed with a carrier on which the compact precision angular-displacement-limiting impact-resistant vibration-isolating buffering platform is mounted. Through the subject invention, the subject invention and the carrier are always kept in a three-dimensional linear translational motion, so that the optoelectronic equipment is always in an excellent vibration impact environment for the optoelectronic equipment to work reliably, and thus enhancing working reliability and long service life of the optoelectronic equipment.

9 Claims, 10 Drawing Sheets

(30) Foreign Application Priority Data

| Mar. 25, 2019 | (CN) | 201920381811.9 |
| Mar. 25, 2019 | (CN) | 201920382449.7 |
| Mar. 25, 2019 | (CN) | 201920382450.X |
| Mar. 25, 2019 | (CN) | 201920382499.5 |
| Mar. 25, 2019 | (CN) | 201920386971.2 |

(56) References Cited

U.S. PATENT DOCUMENTS

| 6,000,671 A * | 12/1999 | Helms | F16F 15/02 248/563 |
| 8,132,773 B1 * | 3/2012 | Platus | F16F 15/02 248/618 |
| 2006/0131471 A1 * | 6/2006 | Sun | F16F 15/02 248/638 |
| 2008/0048069 A1 | 2/2008 | Zheng | |

* cited by examiner

COMPACT PRECISION ANGULAR-DISPLACEMENT-LIMITING IMPACT-RESISTANT VIBRATION-ISOLATING BUFFERING PLATFORM FOR COMPACT OPTOELECTRONIC EQUIPMENT

The present application claims the common filing date of Chinese patent or utility model applications Nr. 2019203869712, Nr. 2019102276697, Nr. 2019203824995, Nr. 2019102276201, Nr. 201920382450X, Nr. 2019203824497 and Nr. 2019203818119 that were filed with The National Intellectual Property Administration (CNIPA) on 25 Mar. 2019. All relevant content and/or subject matter of the earlier priority patent or utility model applications is hereby incorporated by reference wherever relevant, possible and/or appropriate.

The application relates to the technical field of vibration-isolating buffering platform, in particular to a compact precision angular-displacement-limiting impact-resistant vibration-isolating buffering platform for optoelectronic equipment.

Currently, optoelectronic devices of measuring and controlling heading and attitude, such as inertial navigation devices, gyroscopes, radars, optical platforms, etc., are mainly installed rigidly installed on vehicles. In contrast, elastically installed optoelectronic devices are quite limited.

1. Rigid Installation

For some optoelectronic devices, rigid installation well maintains stability and reliability of initial calibration coordinates $(X_0, Y_0, Z_0)$ for position, location or dimension, and pose parameters $(\psi x, \psi y, \psi z)$ for orientation. However, environmental adaptability of these photoelectric devices is relatively high. In particular, requirements for resisting severe impacts and strong vibrations are even higher. Sometimes, even if subjected to photoelectric performance and structural reinforcement, the optoelectronic devices still cannot meet the requirements for ordinary usage, which leads to a fact that qualified optoelectronic products are not available. In these cases, elastically supporting platforms have been used to isolate the severe impacts and strong vibration.

2. Existing Elastic Installation Platform

Existing elastic installation platforms must have the following functions:

(1) to effectively isolate vibration and impact to the photoelectric devices of measuring and controlling heading and attitude;
(2) to ensure that the platform can only have free linear displacements along X, Y and Z axes, but does not allow any micro-angular-displacement beyond a specified accuracy, when the optoelectronic devices are working, Currently, there are two types of micro-angular-displacement elastic supporting platforms commonly used: the first type is "a high-precision impact isolator" having an optoelectronic device compensation for an error of angular-displacement, and its patent application publication number is CN 105020329 A; the second type is a six-link impact isolator disclosed in the "Design of Shipborne Laser Inertial System Impact Isolator" which has no optoelectronic single device compensation for an error of angular-displacement.

A same mechanical principle is applied to the two micro-angular-displacement elastic supporting platforms above, and each supporting rod adopts a spring-dampened form. For each platform, twelve hinge points are arranged on an upper mounting base and a lower mounting base, respectively.

Since the supporting rod is in the spring-dampened form, during the severe impact process, the upper mounting base and the lower mounting base cannot be kept parallel, and angular-displacement is also not limited. Therefore, relative displacements may occur in six degrees of freedom during the impact process; and the optoelectronic device may lose its target. The upper and lower mounting bases are brought to a stationary state only under action of a spring-dampening force. Reset time is defined as a time span from start of the impact to returning to the stationary state. The reset time disclosed is 0.5 second, in which the optoelectronic device cannot work properly. Obviously, an error of relative angular-displacement $(\psi x, \psi y, \psi z)$ of the upper and lower mounting bases in the stationary state is defined as "reset accuracy" of the optoelectronic device. The former has a reset accuracy of 1 angular minute (1') disclosed in a patent document; the latter has a theoretical dynamic accuracy of 33 angular seconds (33") disclosed in a paper.

The above elastic installation has the following characteristics:

(1) A dampening force has a prominent influence on the reset time and reset accuracy.
  (a) Since the dampening force is small, the reset time is long (0.5 second);
  (b) If the dampening force is large, an error is large for the upper and lower mounting platforms to return to a relevant equilibrium state during the resetting; and the reset time is short, but the reset accuracy is poor.
(2) An eccentricity of the device influences the elastic properties of the elastic supporting rod.
  When center of gravity of the device is eccentric on the upper mounting surface, distribution and adjustment of the spring stiffness and the dampening force in the six supporting rods are difficult, and decoupling design of the vibration-isolating buffering system is not easily realized.
(3) Liquid dampening is superior to dry friction dampening.
  Since liquid dampening force is proportional to speed change; therefore, when the liquid dampening is adopted for the severe impact, the larger the transient speed change ΔV is, the larger the dampening force would be. During recovery after the impact, the speed is low, the dampening force is small, the reset time is short, and optoelectronic compensation is also used in the impact and reset process, so the scheme above has a high precision of directivity.
  However, it must be pointed out that the optoelectronic compensation instrument installed on the lower mounting base must be able to directly withstand a severe impact environment; otherwise the optoelectronic compensation would not be effective.
  The reason is that the elastic dampening characteristics are difficult to optimize according to three-axis vibration-isolating buffering performance requirements and reset function requirements, respectively.
  For optoelectronic devices that require a precision angular-displacement-limiting function, a platform comprising an angular-displacement-limiting assembly and a vibration-isolating dampening assembly is provided. Such platform can effectively isolate strong external vibration impact, and also limit the angular-displacement during and after the impact, and thus ensure precise positioning accuracy and working reliability of the optoelectronic equipment.

In order to solve the problems in prior arts, the present application provides a compacted precision angular-displacement-limit impact-resistant vibration-isolating buffering platform, which can effectively isolate and dampen severe impacts and intense vibration environment to optoelectronic equipment to ensure that the optoelectronic device works in an excellent vibration and impact environment for reliable operation, thereby improving the reliability and long service life of the optoelectronic device.

The application comprises an optoelectronic equipment mounting plate and a bottom mounting plate, and an angular-displacement-limiting assembly and a vibration-isolating buffering assembly are provided between the optoelectronic equipment mounting plate and the bottom mounting plate. The vibration-isolating buffering assembly comprises a horizontal axial vibration-isolating buffering device and a vertical vibration-isolating buffering device. A vertical elastic supporting center O of the vertical axial vibration-isolating buffering device is coincided with a mass center C; and an elastic supporting center O1 of the horizontal axial vibration-isolating buffering is approximately coincided with a horizontal plane of the mass center. The vertical vibration-isolating buffering device and the horizontal axial vibration-isolating buffering device render effective impact isolation on the platform to vertical impacts and horizontal impacts, respectively.

The precision angular-displacement-limiting assembly comprises a horizontal-plane angular-displacement-limiting assembly, a middle plate and a vertical angular-displacement-limiting assembly which are configured to form a "Tic-Tac-Toe"-like (also known as a pattern similar to "#") hollow structure. The vertical angular-displacement-limiting assembly is configured at a lower position below the horizontal-plane angular-displacement-limiting assembly and is coupled to the optoelectronic device mounting plate when the impact is primarily from a vertical direction; and the horizontal-plane angular-displacement-limiting assembly is configured at a lower position below the vertical angular-displacement-limiting assembly and is coupled to the bottom mounting plate when the impact is primarily from a horizontal direction.

The vertical vibration-isolating buffering device comprises an outer casing body comprising an outer casing and a bottom plate, and the bottom plate is fixedly connected to the bottom mounting plate; an adjusting bolt is inserted into a center position of an upper portion of the outer casing; and an outer edge of the adjusting bolt is sleeved with a cap and an adjusting nut; the cap and the outer casing are separated by a retaining ring, and an inner ring is sleeved between the outer edge of the cap and the retaining ring; a lower portion of the cap extends axially into the outer casing along the adjusting bolt, whose outer edge is sleeved with an upper cushion; an outer flange is located at a lower end of the cap, an outer edge of the outer flange is sleeved with a metal dampening assembly; a coil spring is mounted between the bottom plate and the adjusting nut; and an outer edge of a lower portion of the coil spring is sleeved with a lower cushion which is fixed at the bottom plate.

The metal dampening assembly comprises a reed group surrounding the outer flange at the lower portion of the cap; a lower end of the reed group is connected to the bottom plate via a cushion sleeve, and an upper portion is pressed tightly against the retaining ring of the outer casing via a split adjusting ring and a cone ring; the reed group comprises straight reed and curved reed that are alternatively distributed.

In a horizontal seat of the horizontal axial vibration-isolating buffering device, an isolation ring is provided with a horizontal buffering ring to separate an upper planar spring from a lower planar spring; a horizontal friction plate is mounted on an upper end of the upper planar spring; a horizontal dampening adjusting sleeve is provided at a center of the horizontal seat; a sliding piece and a disc spring are provided at a lower end of the horizontal dampening adjusting sleeve; and the dampening force is adjusted by a horizontal dampening adjusting nut and then locked and fastened.

Further improvements include: the precision angular-displacement-limiting assembly comprises a three-dimensional linear rolling guiding rail of a cross-shaped sliding rail type, and the precision angular-displacement-limiting assembly forms a "Tic-Tac-Toe"-like (also known as a pattern similar to "#") hollow structure; the three-dimensional linear rolling guiding rail of a cross-shaped sliding rail type comprises an X-axis sliding rest, an XY-axis two-dimensional cross-shaped sliding rail, a YZ-axis integrated two-dimensional sliding rest and a Z-axis sliding rest; an upper portion of the X-axis sliding rest is coupled to the optoelectronic equipment mounting plate, a lower portion of the X-axis sliding rest is coupled to an X-axis sliding rail of the XY-axis two-dimensional cross-shaped sliding rail and slides along an X-axis linearly; the YZ-axis integrated two-dimensional sliding rest comprises a Y-axis sliding rest and at least one Z-axis sliding rail rigidly connected to the Y-axis sliding rest, wherein the Y-axis sliding rest is coupled to a Y-axis sliding rail of the XY-axis two-dimensional cross-shaped sliding rail and slides along a Y-axis; and the Z-axis sliding rest is connected to the at least one Z-axis sliding rail and slides along a Z-axis linearly.

A stiffener is provided between the X-axis sliding rail and the Y-axis sliding rail of the Y-axis two-dimensional cross-shaped sliding rail, the stiffener has a straight polygon shape, a curved polygon or a combination thereof; the Z-axis sliding rest has a linear sliding bearing, the Z-axis sliding rail has steel balls and a sliding way, the steel ball and the sliding way has a contact area and the contact area has a cylindrical profile, a double-V profile, or a spline profile; and a groove is provided on a top end surface of the X-axis sliding rest.

The compacted precision angular-displacement-limiting impact-resistant vibration-isolating buffering platform for optoelectronic equipment of the subject application firstly installs the angular-displacement-limiting assembly between the optoelectronic equipment mounting plate and the bottom mounting plate, and makes the three-axis to freely slide. The horizontal axial vibration-isolating buffering device fixed to the optoelectronic equipment mounting plate and the vertical vibration-isolating buffering device fixed to the bottom plate are then connected via a bearing shaft.

The beneficial effects of the application include:
1. Since the angular-displacement-limiting assembly of the application satisfies a requirement of angular displacement precision of the optoelectronic device and also bears a certain moment of inertia, the vibration-isolating buffering assembly is used to bear impact dynamic load $F_d$ and moment of inertia $M_d$ applied to the angular-displacement-limiting assembly, which ensures that the angular-displacement-limiting assembly is in a state of low impact dynamic load $F_d$ and low impact moment of inertia $M_d$, which further ensures that stability and service life of the limiting accuracy of the angular-displacement-limiting assembly.

2. Since the application adopts combination of the vibration-isolating buffering, vibration-isolating and buffering can be effectively performed to the optoelectronic equipment in the severe impact and the strong vibration environment, thereby ensuring that the optoelectronic equipment works in an excellent vibration and impact environment for reliable operation, and further improving reliability and long service life of optoelectronic equipment.

3. Lower down reinforcement requirements for the optoelectronic device.

4. It provides technical support for transplanting optoelectronic devices that have statically worked on a fixed land basis to various types of carriers (ships, aircraft, rockets, missiles). The optoelectronic equipment is fixed on the optoelectronic equipment mounting plate; the bottom mounting plate is fixed to the carriers on which the compact precision angular-displacement-limiting impact-resistant vibration-isolating buffering platform is mounted. The compact precision angular-displacement-limiting impact-resistant vibration-isolating buffering platform and the carrier are always kept in a three-dimensional linear translational motion, so that the optoelectronic equipment is always in an excellent vibration impact environment for the optoelectronic equipment to work reliably, and thus enhancing working reliability and long service life of the optoelectronic equipment. For example, optoelectronic devices such as navigators, theodolites, and laser devices in various types of carriers are usually connected to a rigid connection platform that is not protected by a vibration-isolating buffering system. The optoelectronic devices have to withstand severe impact and strong vibration environment together with the rigid platform, and thus need to fully reinforce their structures and the optoelectronic system, which in turn leads to an increase in overall weight and cost. In contrast, the subject application discloses the angular-displacement-limiting vibration-isolating buffering platform on which structure of the optoelectronic equipment only needs to be properly reinforced, thereby reducing the overall weight and meanwhile reducing the cost.

5. The precision angular-displacement-limiting assembly has two sliding rails, i.e. a vertical sliding rail and a horizontal sliding rail. In a coordinate XOY (a Cartesian coordinate system in two dimensions, also called a rectangular coordinate system or an orthogonal coordinate system), the horizontal sliding rail is arranged at an angle of 45 degrees (45°) to the directions of impact force $F_x$ and $F_y$, for reducing the impact force in the vertical sliding rail, so that the rail combination may be selected to bear less impact force and have lighter weight.

6. The angular-displacement-limiting assembly comprises the three-dimensional linear rolling guiding rail of a cross-shaped sliding rail type; the X-axis sliding rest connected to the optoelectronic equipment have a screw set of rectangular distribution, which has a large installation joint area. After assembled with the optoelectronic equipment mounting plate, a precision positioning pin may be used to cure and adjust installation accuracy. The XY-axis two-dimensional cross-shaped sliding rail has an integrated structure without a single screw, and thus can be reinforced with stiffener according to the requirements of resisting large impact inertia moment for greatly improving structural strength, stiffness, and stability of directional accuracy. The Y-axis sliding rest and the Z-axis sliding rail has an integrated structure. Since the Y-axis sliding rest has a large bottom area, strength and stiffness of connection between the Y-axis sliding rest and the Z-axis sliding rail is enhanced, which effectively ensures pointing accuracy and stability.

The accompanying figures (Figs.) illustrate embodiments and serve to explain principles of the disclosed embodiments. It is to be understood, however, that these figures are presented for purposes of illustration only, and not for defining limits of relevant applications.

Figure 1:
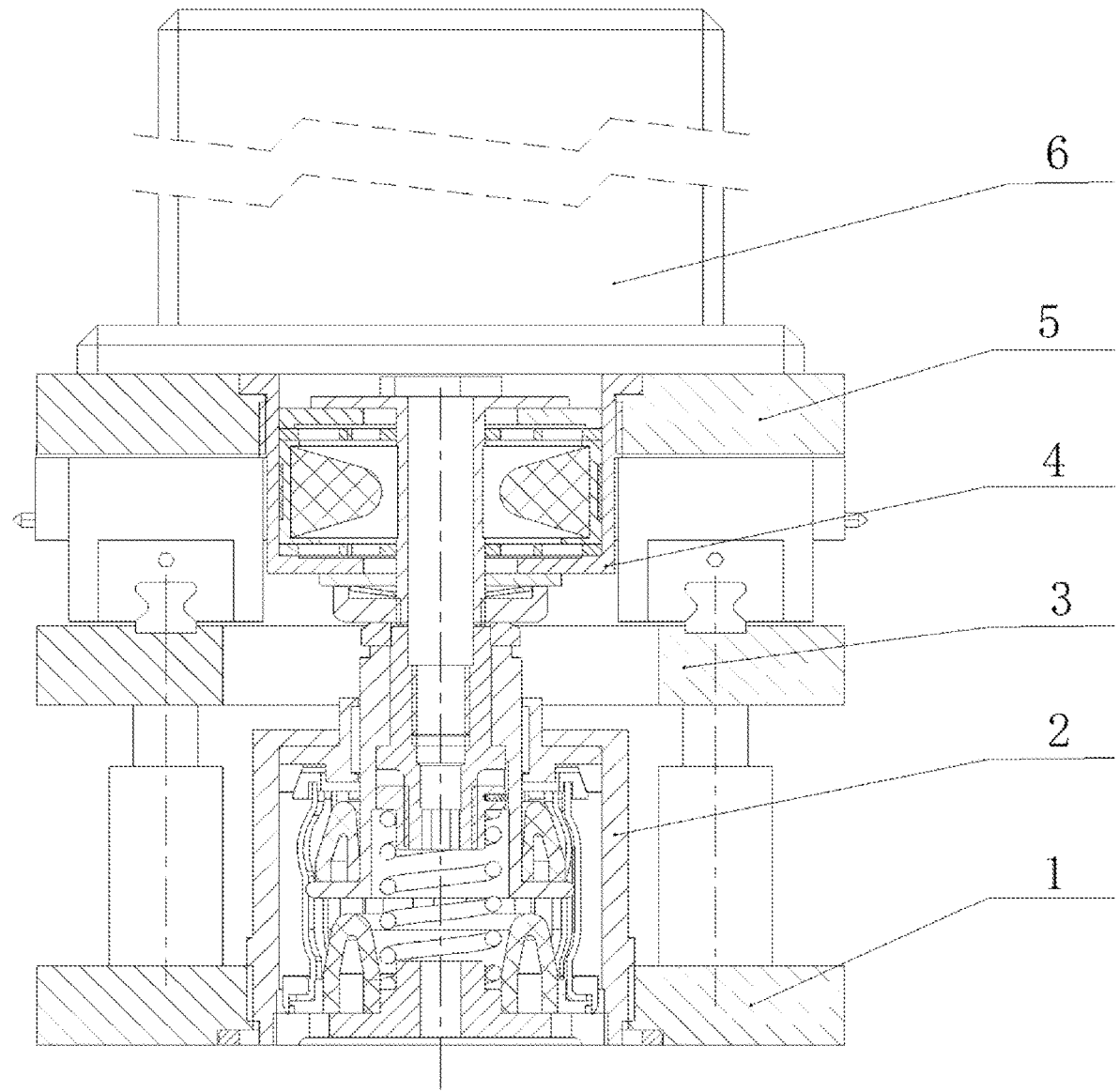
FIG. 1 is a schematic diagram of a precision angular-displacement-limiting impact-resistant vibration-isolating buffering platform.

The structure of the present application is as shown in FIG. 1, comprising an optoelectronic equipment mounting plate 5 for mounting the optoelectronic equipment 6 and a bottom mounting plate 1. The optoelectronic equipment mounting plate 5 and the bottom mounting plate 1 are connected via an angular-displacement-limiting assembly 3 and a vibration-isolating assembly. The vibration-isolating assembly comprises a horizontal axial vibration-isolating buffering device 4 and a vertical vibration-isolating buffering device 2. A vertical elastic supporting center O of the vertical vibration-isolating buffering device 2 is coincided with a mass center C; and an elastic supporting center $O_1$ of the horizontal axial vibration-isolating buffering device 4 is coincided with a horizontal plane of the mass center $C_1$. The vertical vibration-isolating buffering device 2 and the horizontal axial vibration-isolating buffering device 4 render effective impact isolation on the platform to vertical impacts and horizontal impacts, respectively.

Figure 2:
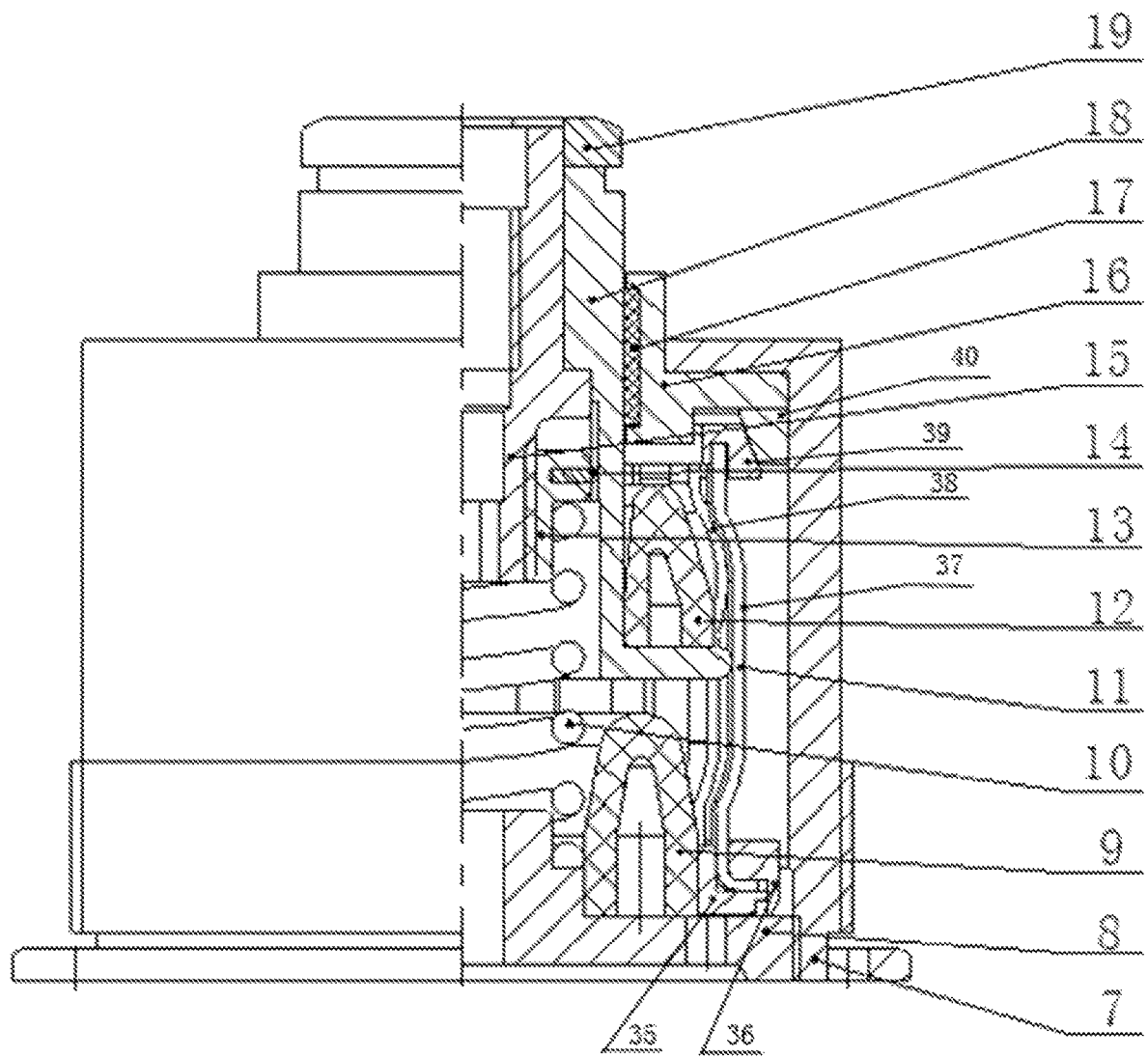
FIG. 2 is a schematic view of a vertical vibration-isolating buffering device of the present application.

As shown in FIG. 2, the vertical vibration-isolating buffering device 2 comprises an outer casing body which further comprises an outer casing 7 and a bottom plate 8. An adjusting bolt 15 is inserted into a center positon of an upper portion of the outer casing 7; and an outer edge of the adjusting bolt 15 is sleeved with a cap 18 and an adjusting nut 19; the cap 18 and the outer casing 7 are separated by a retaining ring 16, and an inner ring 17 is sleeved between the outer edge of the cap 18 and the retaining ring 16; a lower portion of the cap 18 extends axially into the outer casing 7 along the adjusting bolt 15, whose outer edge is sleeved with an upper cushion 12; an outer flange is located at a lower end of the cap 18, an outer edge of the outer flange is sleeved with a metal dampening assembly; a coil spring 10 is mounted between the bottom plate 8 and the adjusting nut 13; and an outer edge of a lower portion of the coil spring 10 is sleeved with a lower cushion 9 which is fixed at the bottom plate 8.

The metal dampening assembly comprise a reed group surrounding the outer flange structure of the lower end of the cap 18, the reed group comprises straight reed 5 and curved reed 17 that are alternatively distributed. A straight reed 37 and a curved reed 38 are riveted into a unitary piece by a lower end of the reed group via a cushion sleeve 35 and a lower ring 36, and is further connected to the bottom plate 8 via the cushion sleeve 35; and an upper end is passed through a split ring 39 and a cone ring 40 and pressed tightly against the outer casing 7 and the retaining ring 16.

Figure 3:
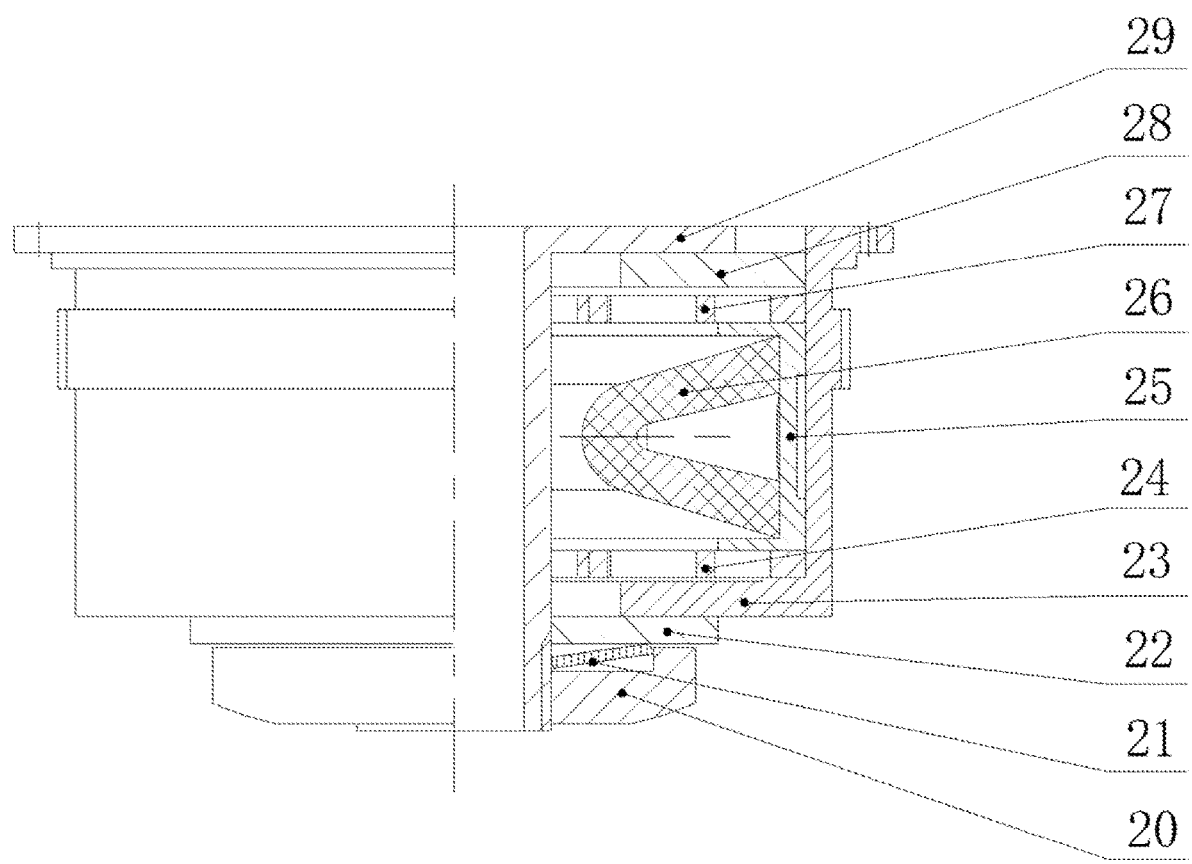
FIG. 3 is a schematic view of a horizontal axial vibration-isolating buffering device of the present application.

As shown in FIG. 3, the horizontal axial vibration-isolating buffering device 4 comprises a sleeve 29 and a housing 23; and a horizontal friction plate 28, an upper planar spring 27, an isolation ring 25 with a horizontal cushion 26 embedded inside, and a lower planar spring 24 are disposed from the top to the bottom between the sleeve 29 and the housing 23 from top to bottom. A space for vibration is left between the horizontal cushion 26 and the and the sleeve 29.

A sliding piece 22 and a horizontal dampening adjusting sleeve 20 are sequentially disposed on an outer edge of the sleeve 29 below the casing 23; and a disc spring 21 is disposed between the horizontal dampening adjusting sleeve 20 and the sliding piece 22. An outer cylindrical surface of the housing 23 has a thread to be connected to the optoelectronic equipment mounting plate 5. A bearing shaft is passed through the sleeve 29 and connected to vertical vibration-isolating buffering device 2 via a thread.

Figure 4:
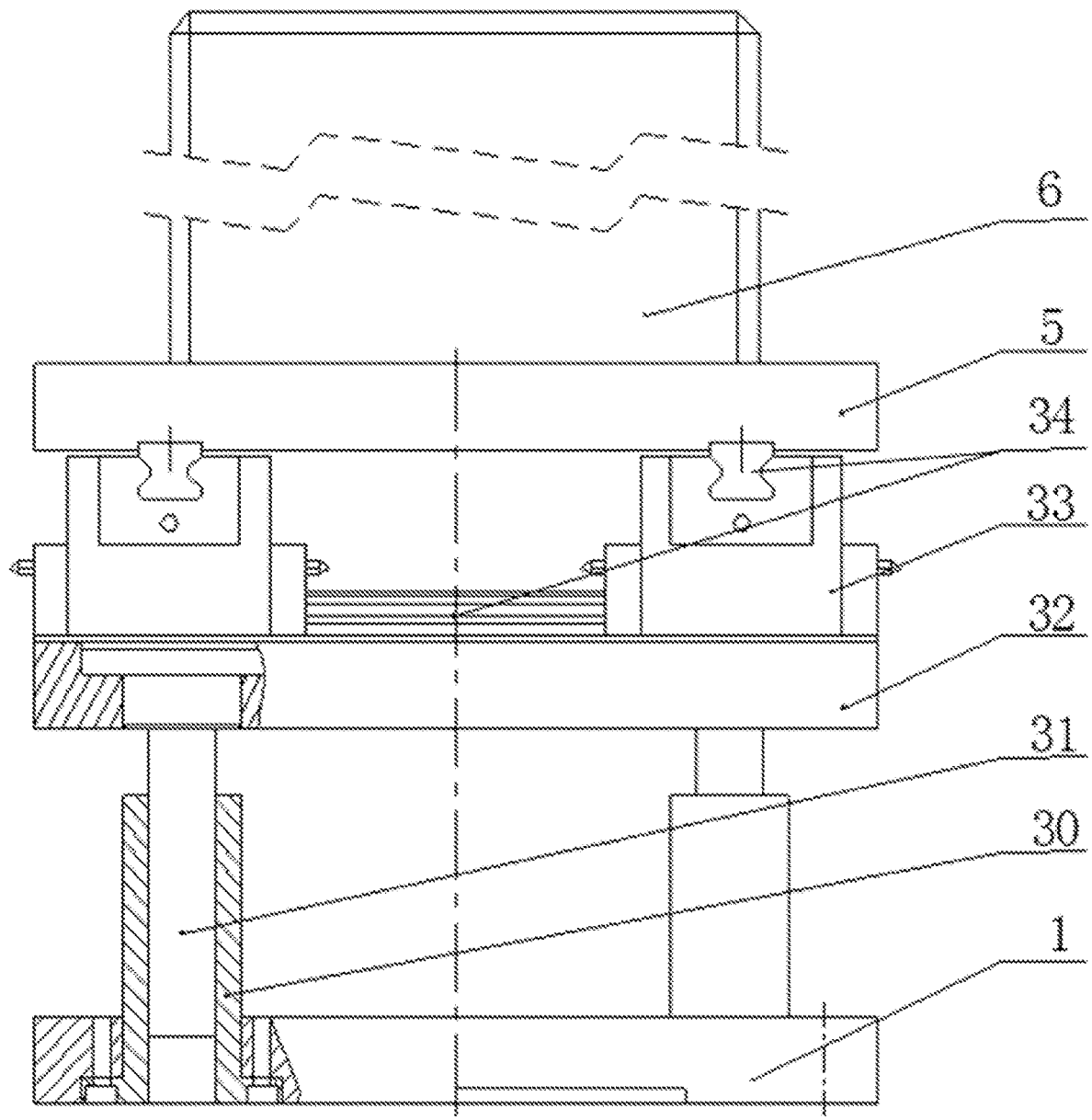
FIG. 4 is a schematic view of the precision angular-displacement-limiting assembly where the vertical angular-displacement-limiting assembly is at a lower position.

As shown in FIG. 4, the precision angular-displacement-limiting assembly 3 comprises a horizontal-plane angular-displacement-limiting assembly 3, a middle plate 32 and a vertical angular-displacement-limiting assembly 3 which are configured to form a "Tic-Tac-Toe"-like (also known as a pattern similar to "#") hollow structure. A vertical rail has two arrangements, i.e. an upper position (FIG. 5) and a lower position (FIG. 4). An example of the lower position is shown in FIG. 4.

The horizontal-plane angular-displacement-limiting assembly 3 comprises four two-dimensional sliding rests 33, and each of four two-dimensional sliding rests 33 further comprises two sliding chutes, i.e. a vertical sliding chute and a horizontal sliding chute. A hollow "Tic-Tac-Toe"-like (also known as a pattern similar to "#") structure formed by a one-dimensional linear sliding rail 34 is inserted into each of the two sliding chute. The one-dimensional linear sliding rail 34 at a top position is connected to the optoelectronic equipment mounting plate 5; and the one-dimensional linear sliding rail 34 at a bottom position is connected to the middle plate 32.

The vertical angular-displacement-limiting assembly 3 comprises four vertical sliding rails 31 and four vertical sliding rests 30, wherein the vertical sliding rails 31 are orthogonally connected to the middle plate 32, and the vertical sliding rests 30 are orthogonally connected to the bottom mounting plate 1, the vertical sliding rails 31 are movably connected to the vertical sliding rests 30 by being inserted into the vertical sliding rests 30.

A vertical angular-displacement-limiting assembly, the vertical sliding rail 31 is only connected with the optoelectronic equipment mounting plate for mounting the optoelectronic equipment 6 and the bottom mounting plate which is connected to a carrier. The structure is compacted, and many connecting pieces for one-dimensional guiding rail structure and many screws are thus avoided; and the structure has an excellent rigidity; and the angular-displacement-limiting function is also stable and reliable.

The upper position or the lower position of the vertical rail is determined by value of vertical impact acceleration $\ddot{z}_o$, and value of horizontal acceleration ($\ddot{x}_o$, $\ddot{y}_o$).

(1) When $\ddot{z}_o < (\ddot{x}_o, \ddot{y}_o)$, in order to reduce the horizontal impact acceleration to the vertical rail, after vertical buffering action of the vertical vibration-isolating buffering device, the upper position of the vertical rail is selected [FIG. 4].

Figure 5:
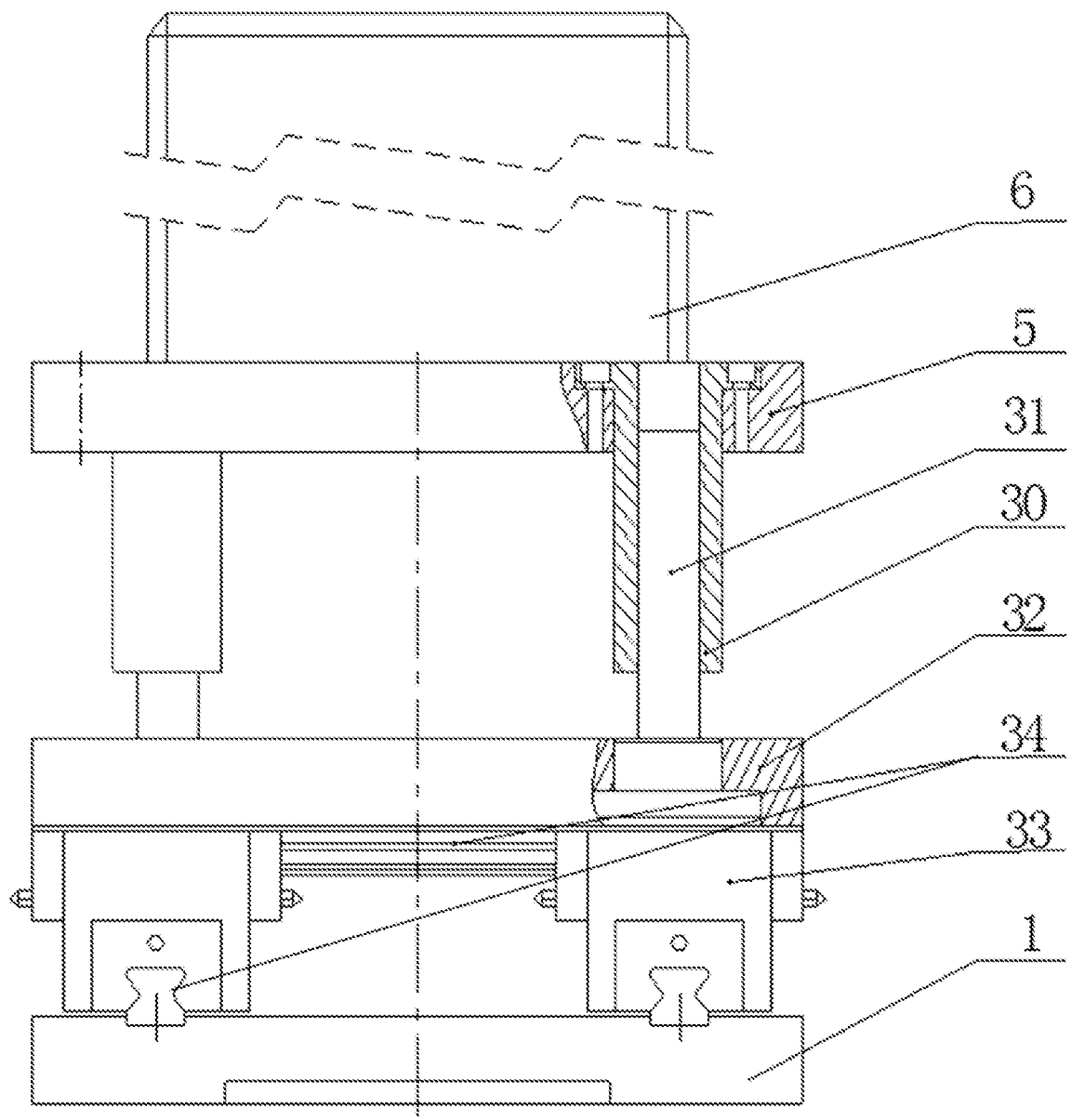
FIG. 5 is a schematic view the precision angular-displacement-limiting assembly where the precision angular-displacement-limiting is at an upper position.

(2) When $\ddot{z}_o > (\ddot{x}_o, \ddot{y}_o)$, in order to reduce the vertical impact acceleration to the horizontal rail, after vertical buffering action of the vertical vibration-isolating buffering device, the lower position of the vertical rail is selected [FIG. 5].

(3) In order to further reduce the horizontal impact acceleration ($\ddot{x}_o$, $\ddot{y}_o$) to each horizontal rail, direction of the impact force may be arranged at an angle of 45 degrees (45°) to coordinate axis of the horizontal rail. Therefore, a force applied to each horizontal rail is $\sqrt{2}/4F$, and the horizontal axial vibration-isolating buffering device and equipment only is only subjected to a remaining impact response acceleration after the buffering action of a horizontal buffering device.

Figure 6:
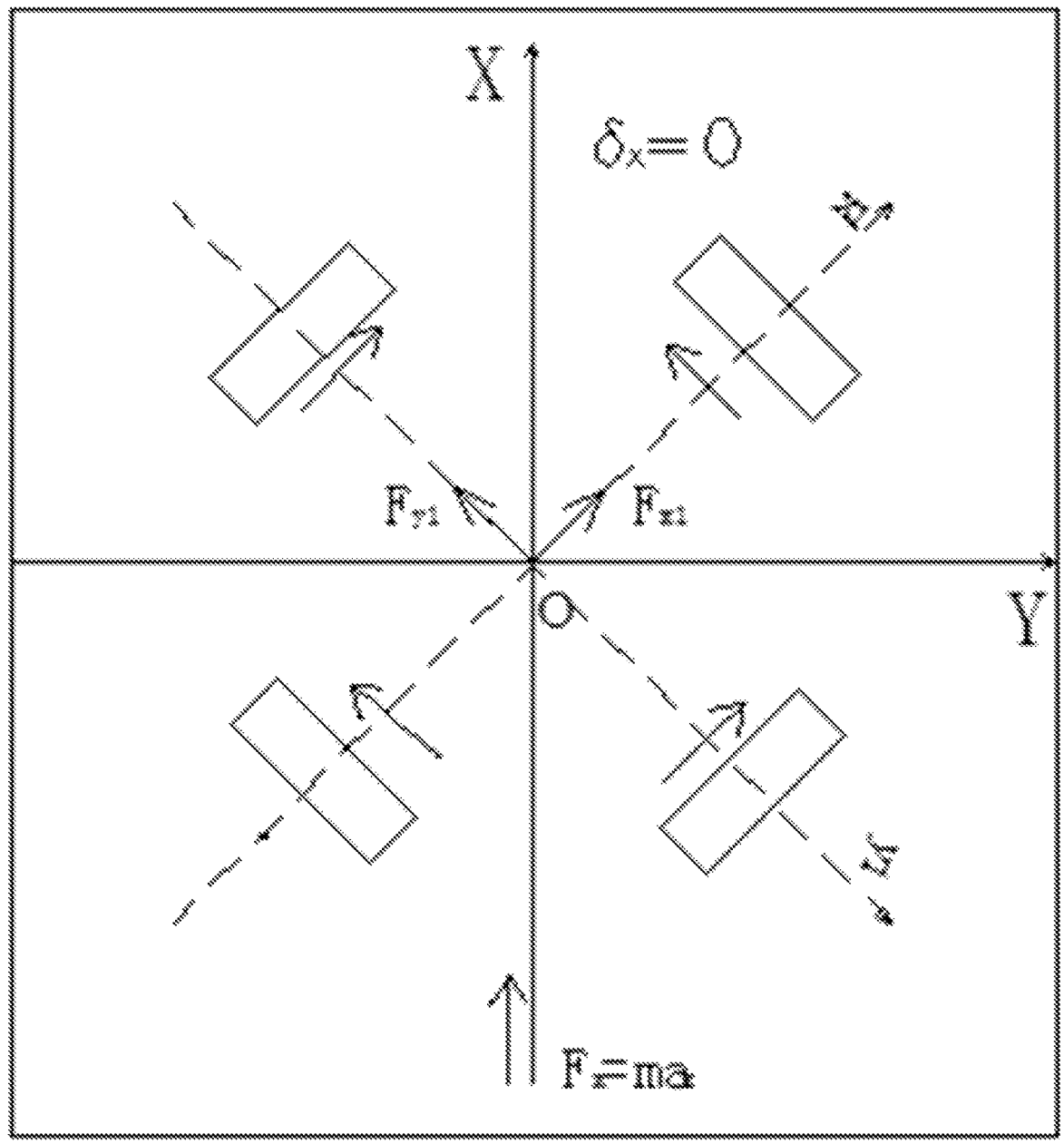
FIG. 6 is a schematic view showing a mounting plane of the horizontal rail and direction of an impact force is arranged at an angle of 45°, particularly a schematic view showing the impact along the X-axis.
Figure 7:
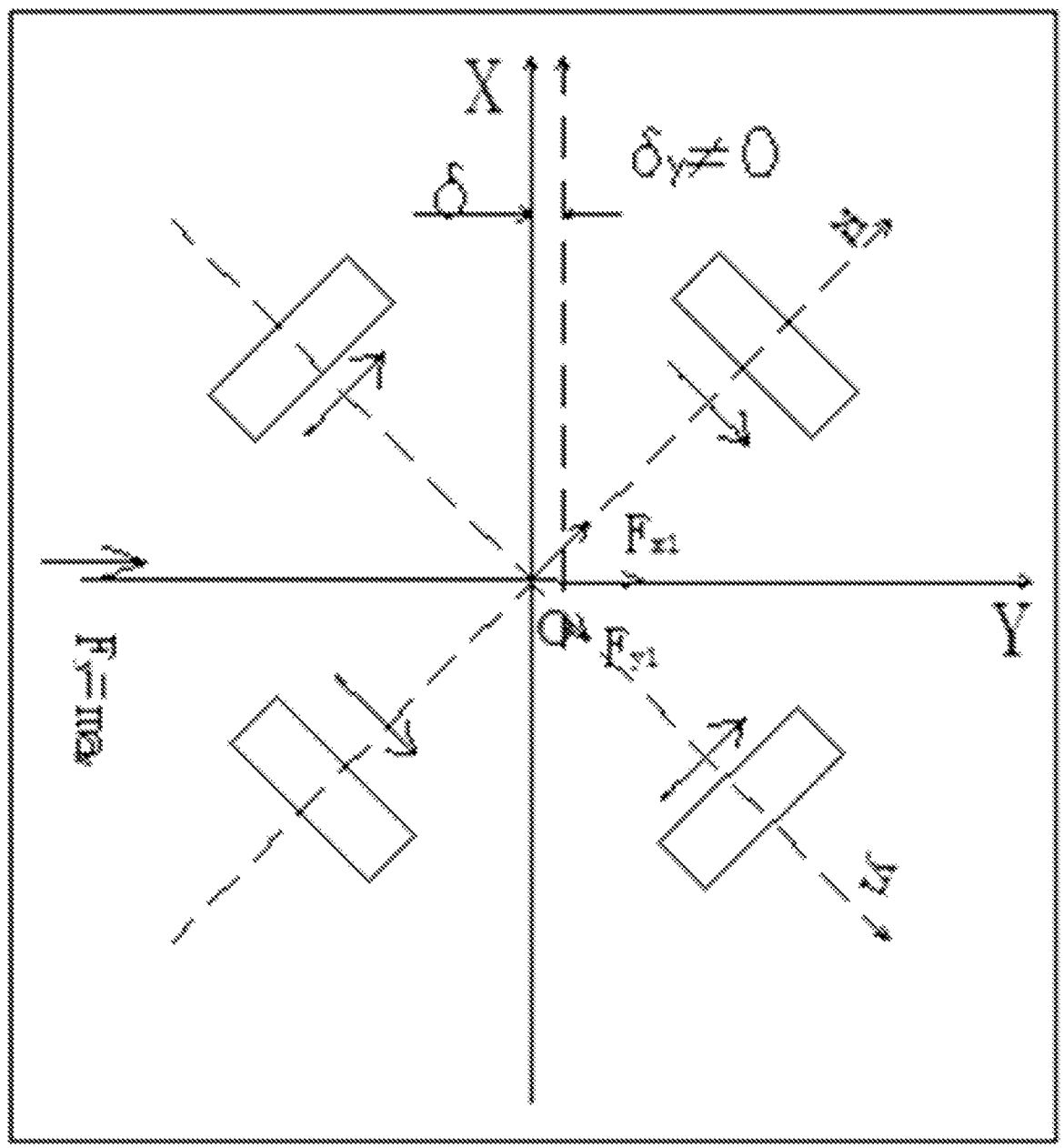
FIG. 7 is a schematic view showing a mounting plane of the horizontal rail and direction of an impact force is arranged at an angle of 45°, particularly a schematic view showing the impact along the Y-axis.

As shown in FIGS. 6 & 7, in order to reduce the horizontal impact acceleration to the horizontal rail, the horizontal rail may be arranged at an offset of an angle of 45 degrees (45°) to heading X-axis. In this case, the X-axis or the Y-axis are respectively subjected to maximum value of the impact acceleration peak $a_{x0}$ or $a_{y0}$, while assuming $Fx=ma_x$, $Fy=ma_y$, where: $a_x$, $a_y$ represent strong impact acceleration along the x-axis and the y-axis, respectively; and m represents an average mass of electronic devices, the upper mounting plate and the angular-displacement-limiting assembly 3.

The horizontal rail is subjected to a force Fx' in the X'-axis direction and a force Fy' in the Y'-axis direction. Since guiding rails of the horizontal rail in the x-axis direction and the y-axis direction are respectively in $X'_1 O'Y'_1$ and $X''_2 O''Y''_2$ platforms. In this case, no matter the strong impact is applied to the x-axis direction or the y-axis direction, conclusion is established as $Fx=ma_x=Fx_1'+Fy_1''$ (see FIG. 6), $Fy=ma_y=Fx2'+Fy_2''$ (see FIG. 7).

Since the guiding rails in both directions are simultaneously subjected to load of the impact regardless of the strong impact applied in the x-axis direction or the y-axis direction, the force applied to the guiding rail in each direction is only $\sqrt{2}/2$ times of the load of the impact in the direction. Therefore, service life and reliability of the Z-axis sliding rail are enhanced.

Figure 8:
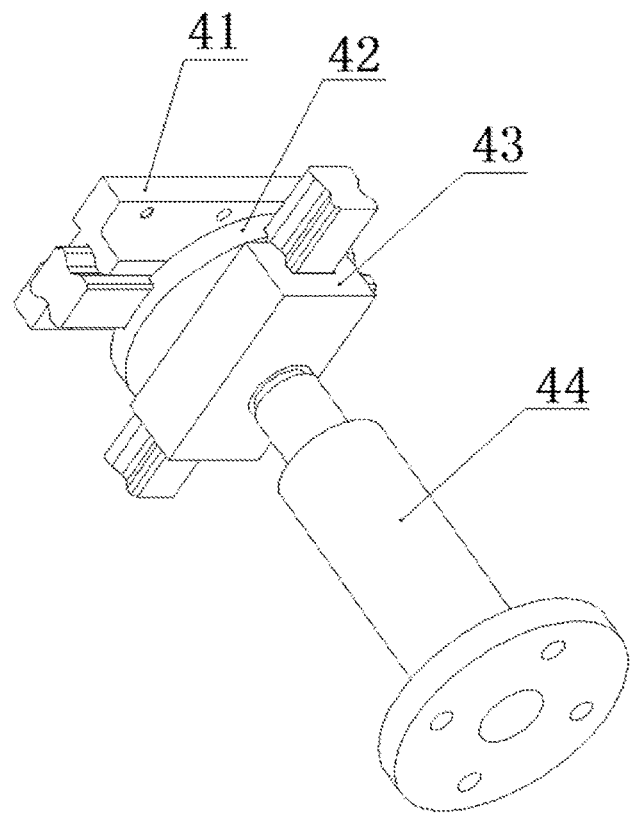
FIG. 8 is a schematic view of a three-dimensional linear rolling guiding rail of a cross-shaped sliding rail type.
Figure 9:
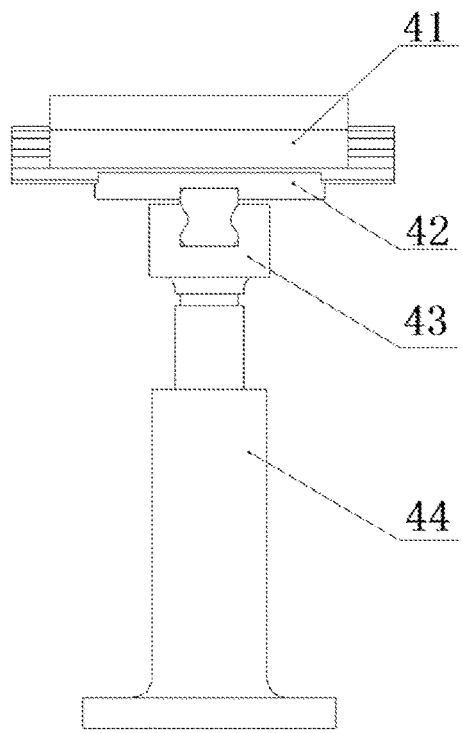
FIG. 9 is a front view of the three-dimensional linear rolling guiding rail of a cross-shaped sliding rail type.
Figure 10:
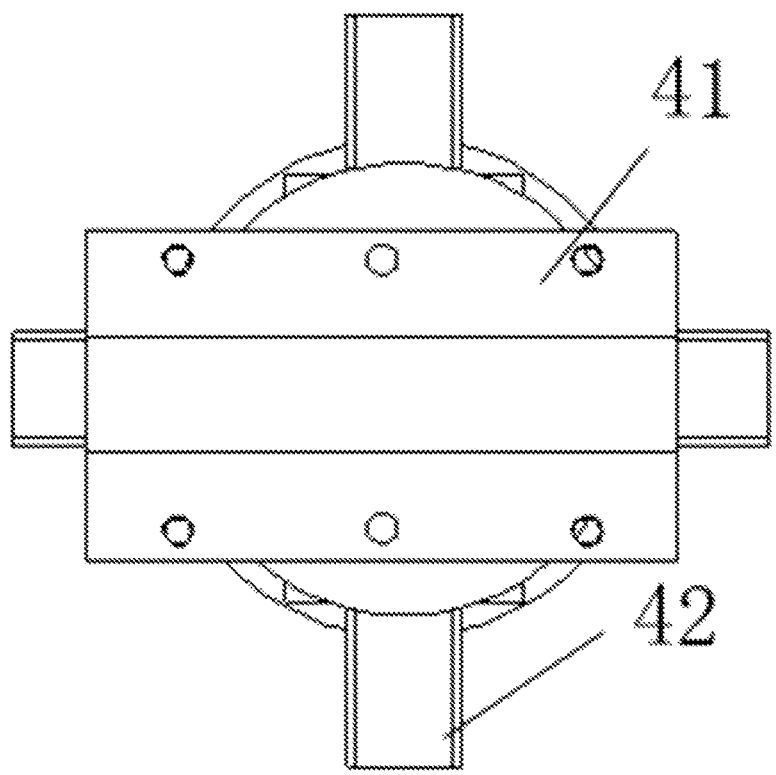
FIG. 10 is a top view of the three-dimensional linear rolling guiding rail of a cross-shaped sliding rail type.

To further improve: the precision angular-displacement-limiting assembly 3 comprises a three-dimensional linear rolling guiding rail of a cross-shaped sliding rail type, and the precision angular-displacement-limiting assembly 3 forms a "Tic-Tac-Toe"-like (also known as a pattern similar to "#") hollow structure; structure of the three-dimensional linear rolling guiding rail of a cross-shaped sliding rail type is shown in FIG. 8, FIG. 9 and FIG. 10, which comprises an X-axis sliding rest 41, an XY-axis two-dimensional cross-shaped sliding rail 42, a YZ-axis integrated two-dimensional sliding rest 43 and a Z-axis sliding rest 44. An upper portion of the X-axis sliding rest 41 is coupled to the optoelectronic equipment mounting plate 5, a lower portion of the X-axis sliding rest 41 is coupled to an X-axis sliding rail of the XY-axis two-dimensional cross-shaped sliding rail 42 and slides along an X-axis linearly; the YZ-axis integrated two-dimensional sliding rest 43 comprises a Y-axis sliding rest and at least one Z-axis sliding rail rigidly connected to the Y-axis sliding rest, wherein the Y-axis sliding rest is coupled to a Y-axis sliding rail of the XY-axis two-dimensional cross-shaped sliding rail 42 and slides along a Y-axis; and the Z-axis sliding rest 44 is connected to the Z-axis sliding rail and slides along a Z-axis linearly.

Figure 13:
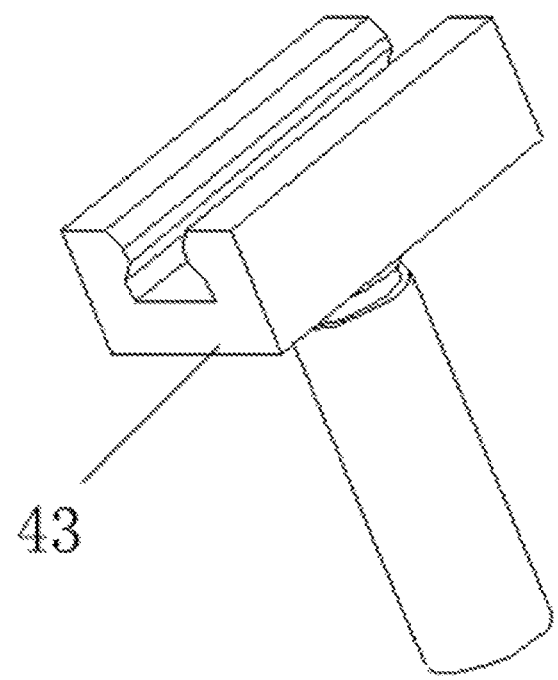
FIG. 13 is a schematic view of a YZ-axis integrated two-dimensional sliding rest of the three-dimensional linear rolling guiding rail of a cross-shaped sliding rail type.

As shown in FIG. 13, the YZ-axis integrated two-dimensional sliding rest 43 comprises a Y-axis sliding rest and a Z-axis sliding rail rigidly connected to the Y-axis sliding rest, both of which construct a T-shaped two-dimensional structure. Alternatively, the Y-axis sliding rest and the Z-axis sliding rest 44 construct a cross-shaped sliding rest two-dimensional structure.

Figure 12:
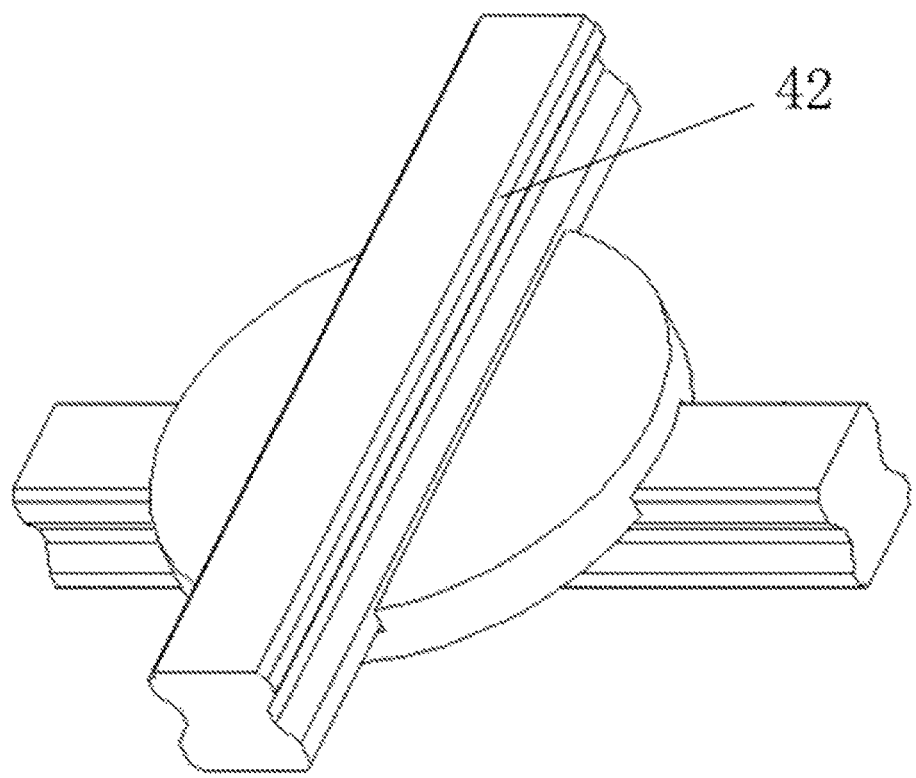
FIG. 12 is a schematic view of an XY-axis two-dimensional cross-shaped sliding rail of the three-dimensional linear rolling guiding rail of a cross-shaped sliding rail type.

As shown in FIG. 12, a stiffener is provided between the X-axis sliding rail and the Y-axis sliding rail of the Y-axis two-dimensional cross-shaped sliding rail 44; and the stiffener has a straight polygon shape, a curved polygon shape or a combination of the straight polygon shape and the curved polygon shape.

The Z-axis sliding rest 44 has a linear sliding bearing, and the linear sliding bearing has steel balls and a sliding way, the steel ball and the sliding way has a contact area and the contact area has a cylindrical profile, a double-V profile, or a spline profile.

Figure 11:
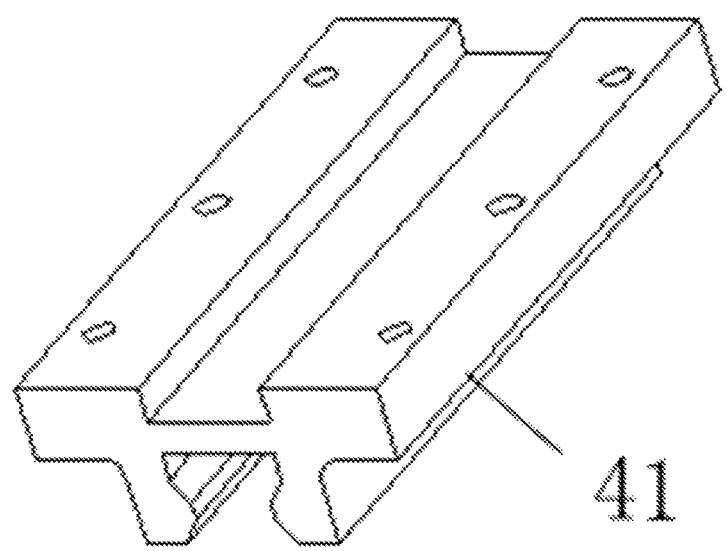
FIG. 11 is a schematic view of an X-axis sliding rest of the three-dimensional linear rolling guiding rail of a cross-shaped sliding rail type.

The X-axis sliding rest 41 is shown in FIG. 11. The X-axis sliding rail is replaced by the X-axis sliding rest 41; X-axis sliding rest 41 is connected to a square-shaped screw hole of the optoelectronic equipment mounting plate 5 for enhancing ability to resist moment of inertia from the Y-axis direction. A groove is provided on a top end surface of the X-axis sliding rest 41 for saving material.

The present application may have many specific embodiments, and only best modes are described in the above for the present application. It should be noted that those skilled in the art may make some improvements without departing from the principle of the present application. Improvements should also be considered within protection scope of the present application.

The invention claimed is:

1. A compact precision angular-displacement-limiting impact-resistant vibration-isolating buffering platform for optoelectronic equipment, comprising:
    an optoelectronic equipment mounting plate; and
    a bottom mounting plate;
    wherein
    the optoelectronic equipment mounting plate and the bottom mounting plate are configured to be coupled via a precision angular-displacement-limiting assembly and a vibration-isolating assembly;
    the vibration-isolating assembly further comprises a horizontal axial vibration-isolating buffering device and a vertical vibration-isolating buffering device;
    the vertical vibration-isolating buffering device further comprises a vertical elastic supporting center O which is coincided with a mass center C; and
    the precision angular-displacement-limiting assembly comprises a horizontal-plane angular-displacement-limiting assembly, a middle plate and a vertical angular-displacement-limiting assembly which are configured to form a hollow structure.

2. The compact precision angular-displacement-limiting impact-resistant vibration-isolating buffering platform of claim 1, wherein the vertical vibration-isolating buffering device comprises
    an outer casing body comprising an outer casing and a bottom plate, and the outer casing body is fixedly connected to the bottom mounting plate;
    an adjusting bolt is inserted into a center position of an upper portion of the outer casing, and a hexagon ring is installed into a top portion of the adjusting bolt;
    the adjusting bolt has a shaft shoulder in a middle portion of an outer edge, an upper portion and a lower portion of the shaft shoulder are sleeved with a cap and screwed with an adjusting nut, respectively;
    a retaining ring is arranged between an upper portion of the cap and the outer casing, an outer edge of the cap and the retaining ring are engaged by an inner ring, and an outer edge of the retaining ring and an inner hole of the outer casing are engaged;
    a lower portion of the cap extends axially into the outer casing along the adjusting bolt, an outer flange is located at a lower end of the cap, an outer edge of the outer flange is sleeved with a metal dampening assembly, an upper cushion is sleeved on the outer edge of the cap at an upper portion of the outer flange, and a distance is left between the upper cushion and the retaining ring;
    a coil spring is mounted between the bottom plate and the adjusting nut; and
    a lower cushion is provided on the bottom plate, the lower cushion is positioned outside, and the lower cushion is vertically spaced apart from a lower flange of the cap.

3. The compact precision angular-displacement-limiting impact-resistant vibration-isolating buffering platform of claim 1, wherein
    the horizontal axial vibration-isolating buffering device comprises a housing with an opening at a lower portion of the housing, a sleeve is provided in the housing, a flange is provided to an upper portion of the flange, and a lower portion of the sleeve extends out of the housing;
    a horizontal friction plate, an upper planar spring, a horizontal buffering ring and a lower planar spring are arranged from top to bottom between the flange of the sleeve and the housing;
    a gap is left between the flange of the sleeve and an inner wall of the housing, and a gap is left between the sleeve and the opening at the lower portion of the housing;
    an outer edge of the horizontal friction plate is in contact with the inner wall of the housing, and a gap is left between an inner wall of the horizontal friction plate and an outer edge of the sleeve;
    outer edges of the upper planar spring and the lower planar spring are in contact with the inner wall of the housing, and inner walls of the upper planar spring and the lower planar spring are in contact with the outer edge of the sleeve;

an outer edge of the horizontal buffering ring is in contact with the inner wall of the housing via an isolation ring, a gap is left between an inner wall of the horizontal buffering ring and the outer edge of the sleeve;

a sliding piece and a horizontal adjusting nut are provided from top to bottom on an outer edge of a portion of the outer sleeve, the portion extends out of the housing, a disc spring is provided inside the horizontal adjusting nut, and the disc spring has a height higher than an upper plane of the horizontal adjusting nut; and an outer wall of the housing is fixedly connected to the photoelectric equipment mounting plate.

4. The compact precision angular-displacement-limiting impact-resistant vibration-isolating buffering platform of claim 3, wherein the horizontal axial vibration-isolating buffering device and the vertical vibration-isolating buffering device are connected by a connecting shaft, the connecting shaft is passed through the sleeve of the horizontal axial vibration-isolating buffering device, inserted into a matching through hole inside the adjusting bolt of the vertical vibration-isolating buffering device, and screwed tightly for making the horizontal adjusting nut of the horizontal axial vibration-isolating buffering device and the vertical vibration-isolating buffering device fixedly connected.

5. The compact precision angular-displacement-limiting impact-resistant vibration-isolating buffering platform of claim 1, wherein the precision angular-displacement-limiting assembly has at least two sliding rails, wherein a first sliding rail of the at least two sliding rails is configured to be perpendicular to a direction of an impact force, and a second sliding rail of the at least two sliding rails is configured to be perpendicular to the first sliding rail.

6. The compact precision angular-displacement-limiting impact-resistant vibration-isolating buffering platform of claim 1, wherein the precision angular-displacement-limiting assembly has at least two sliding rails, wherein both a first sliding rail and a second sliding rails of the at least two sliding rails are arranged at an angle of 45 degrees to the direction of the impact force.

7. The compact precision angular-displacement-limiting impact-resistant vibration-isolating buffering platform of claim 1, wherein the vertical angular-displacement-limiting assembly is configured below the horizontal-plane angular-displacement-limiting assembly and is coupled to the optoelectronic device mounting plate when the impact is primarily from a vertical direction; and the horizontal-plane angular-displacement-limiting assembly is configured below the vertical angular-displacement-limiting assembly and is coupled to the bottom mounting plate when the impact is primarily from a horizontal direction.

8. The compact precision angular-displacement-limiting impact-resistant vibration-isolating buffering platform of claim 1, wherein the precision angular-displacement-limiting assembly comprises a three-dimensional linear rolling guiding rail of a cross-shaped sliding rail type, and the precision angular-displacement-limiting assembly forms a hollow structure;

the three-dimensional linear rolling guiding rail of a cross-shaped sliding rail type comprises an X-axis sliding rest, an XY-axis two-dimensional cross-shaped sliding rail, a YZ-axis integrated two-dimensional sliding rest and a Z-axis sliding rest;

an upper portion of the X-axis sliding rest is coupled to the optoelectronic equipment mounting plate, a lower portion of the X-axis sliding rest is coupled to an X-axis sliding rail of the XY-axis two-dimensional cross-shaped sliding rail and slides along an X-axis linearly;

the YZ-axis integrated two-dimensional sliding rest comprises a Y-axis sliding rest and at least one Z-axis sliding rail rigidly connected to the Y-axis sliding rest, wherein the Y-axis sliding rest is coupled to a Y-axis sliding rail of the XY-axis two-dimensional cross-shaped sliding rail and slides along a Y-axis; and the Z-axis sliding rest is connected to the at least one Z-axis sliding rail and slides along a Z-axis linearly.

9. The compact precision angular-displacement-limiting impact-resistant vibration-isolating buffering platform of claim 8, wherein a stiffener is provided between the X-axis sliding rail and the Y-axis sliding rail of the Y-axis two-dimensional cross-shaped sliding rail, the stiffener has a straight polygon shape, a curved polygon shape or a combination thereof;

the Z-axis sliding rest has a linear sliding bearing, the Z-axis sliding rail has steel balls and a sliding way, the steel ball and the sliding way has a contact area and the contact area has a cylindrical profile, a double-V profile, or a spline profile; and a groove is provided on a top end surface of the X-axis sliding rest.

* * * * *